Feb. 28, 1967  J. C. FINNIGAN  3,306,662
ATTACHMENT FOR VEHICLE SAFETY BELTS AND SHOULDER HARNESS
Filed Jan. 15, 1965  3 Sheets-Sheet 1

INVENTOR.
JOSEPH C. FINNIGAN,
BY
Berman, Davidson & Berman
ATTORNEYS.

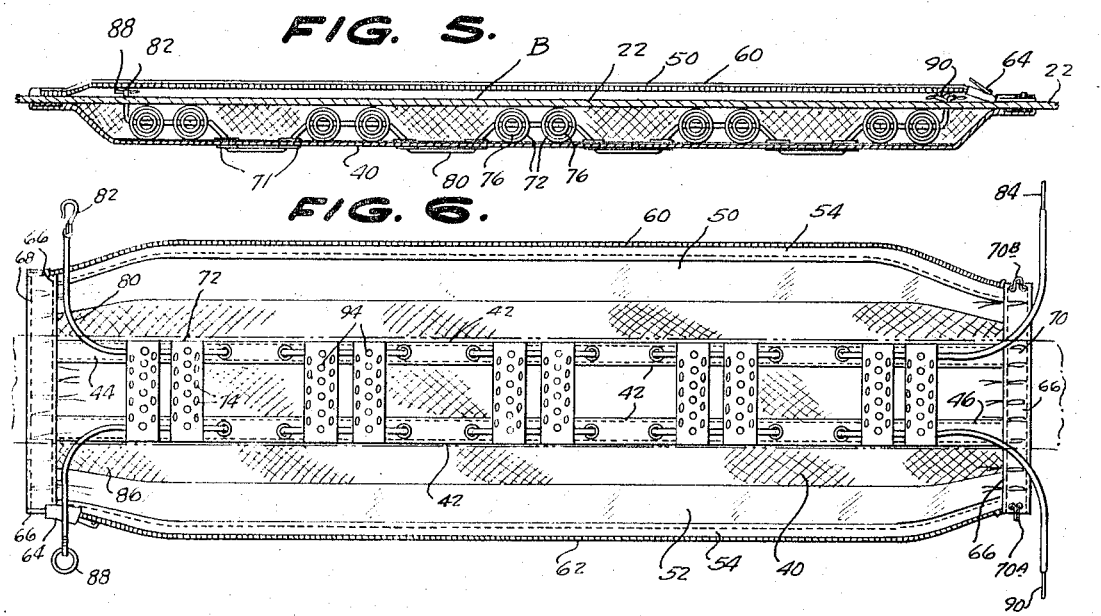
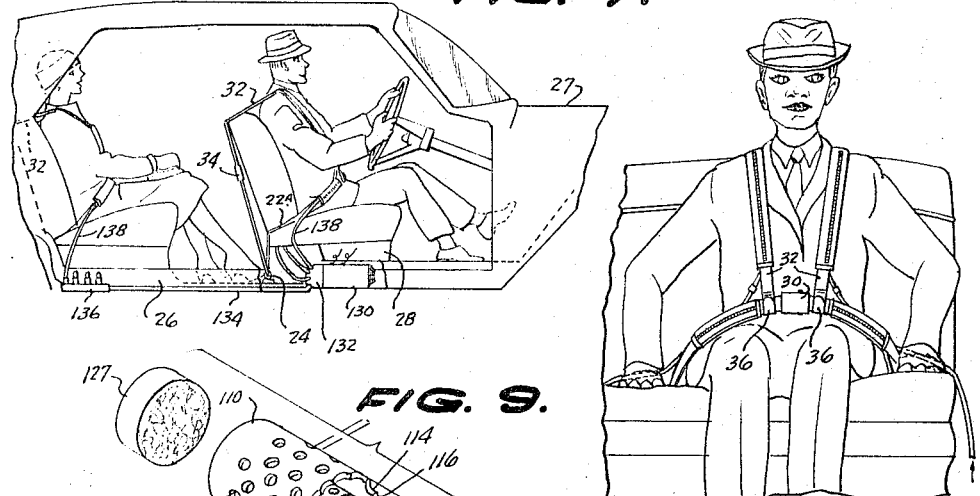
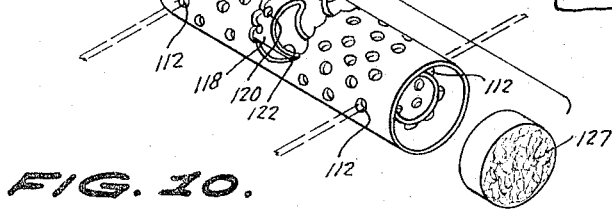
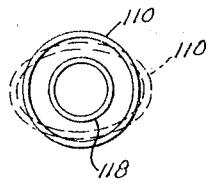

Feb. 28, 1967   J. C. FINNIGAN   3,306,662
ATTACHMENT FOR VEHICLE SAFETY BELTS AND SHOULDER HARNESS
Filed Jan. 15, 1965   3 Sheets-Sheet 3
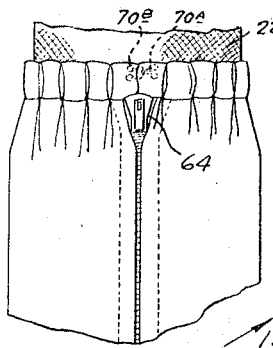
FIG. 11.
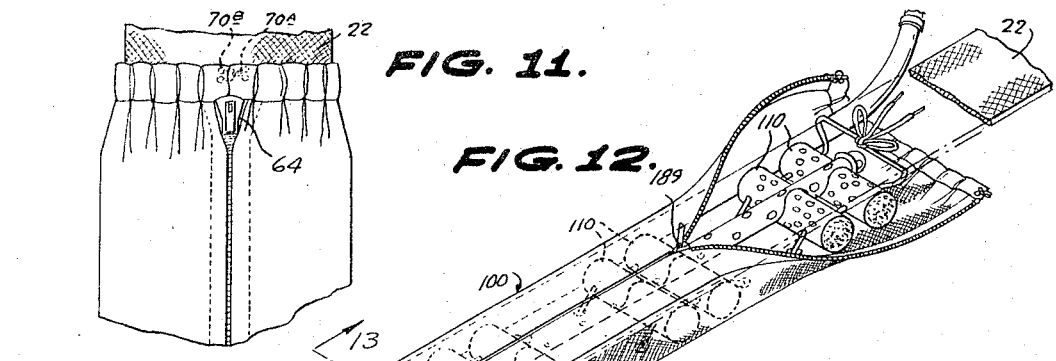
FIG. 12.
FIG. 13.
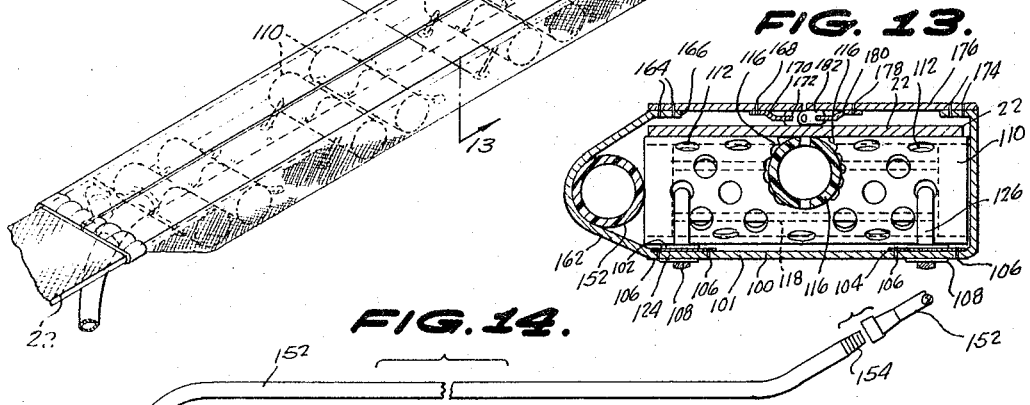
FIG. 14.
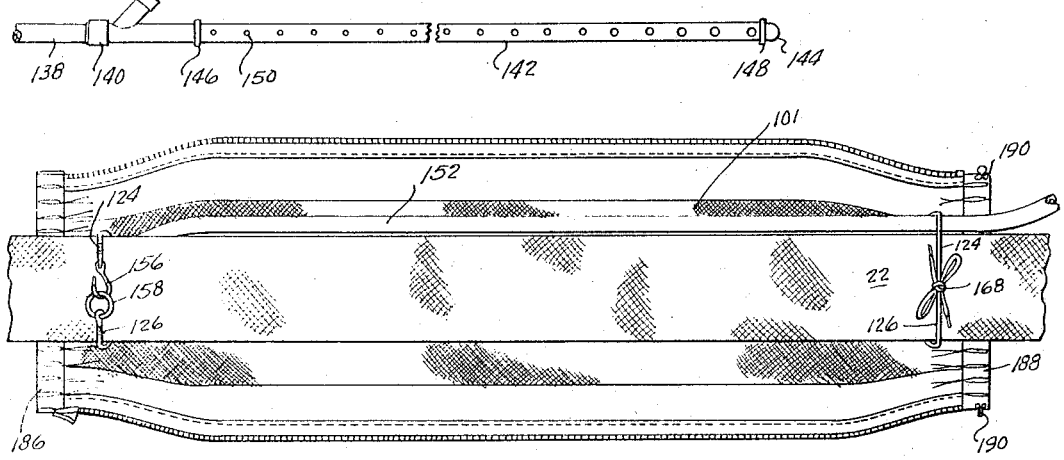
FIG. 15.
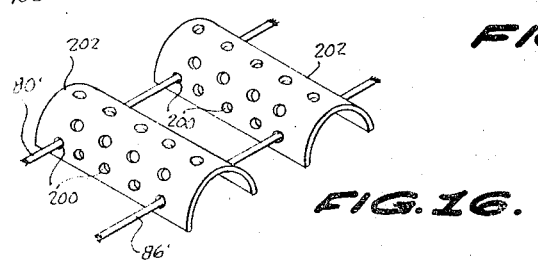
FIG. 16.
INVENTOR.
JOSEPH C. FINNIGAN,
BY
Berman, Davidson & Berman
ATTORNEYS.

United States Patent Office 3,306,662
Patented Feb. 28, 1967

3,306,662
ATTACHMENT FOR VEHICLE SAFETY BELTS
AND SHOULDER HARNESS
Joseph C. Finnigan, 2644 N. Ohio St.,
Arlington, Va. 22207
Filed Jan. 15, 1965, Ser. No. 425,909
11 Claims. (Cl. 297—389)

It is common knowledge that the rate of injury is ever-increasing in the United States as a consequence of the operation of automotive vehicles and the now major use of airplanes. Most States post road warnings of danger sites and many conduct driver safety campaigns, all of which, while being beneficial, do not directly tend to insure the safety of the driver or pilot and the passengers in the vehicle operated thereby.

In connection with the operation of automotive vehicles, perhaps the biggest forward stride in recent years with respect to the safety of the driver and his passengers comprises cognizance by the public of the importance of providing seat belts and the insistence on the part of some States that safety belts be not only afforded to the driver and passengers of a driven vehicle, but also the insistence of their use. However, despite the public's awareness of the possible injury to the driver or passengers as the result of an accident wherein both the driver and passengers are thrown about the vehicle due to the force of inertia or other forces, seat belts are generally ignored. This is not due to any lack of mental perception or memory, but more frequently arises from the individual's resentment of restraint of movement in the vehicle accompanied by a reluctance to wear a belt. This is not an actual case of apathy on the part of the public, but constitutes a rejection on the part of the individual to wear the belt since the conventional safety belts and shoulder harness create areas of perspiration which is not only uncomfortable, but which also gives rise to garment soilage through those areas on which the belt or harness is worn. Additionally, in climates wherein cold weather prevails one is encumbered with an overcoat and the constraining action of a seat belt or shoulder harness taken together with the individual's tendency to perspire in the areas contacted thereby tends to cause the operator of the vehicle and his passengers to ignore the use of the safety belt and shoulder harness, as a rule. Again, and on the other hand, the discomfort experienced by the operator of an automotive vehicle and his passengers in climates which normally experience hot humid weather tends to encourage the disuse of such safety equipment since the same leads to excessive perspiration in the areas contacted by the safety equipment, especially if the vehicle is not air conditioned.

However, there is widespread acceptance of seat belts and their use by the public, at large, and while the belts, per se, do tend to affect a reduction in personal injuries and deaths, it has been found that if the seat belt were used in conjunction with a shoulder harness, injury to the driver and his passengers could be further reduced, but here, too, the public has registered a lack of general acceptance to both the seat belt and the shoulder harness due to the newness of the devices and the invenvenience normally encountered in wearing the same due, partially, to the fact that both the belt and the shoulder harness tend to cause excessive perspiration in skin areas adjacent thereto.

It is also noted that most objections to the use of seat belts and shoulder harness resides in the fact that prior art devices in this field provide but little flexibility and in such known equipment the restraining devices permit but a limited "breathing" area at the points of restraint. This necessarily results in excessive perspiration in the encompassed area and is a direct consequence in the mussing of clothing since the wearer will, constantly, tug on this clothing to remove the perspiration-saturated area from one position to another in order to achieve some comfort.

In view of the disadvantages as generally noted above in connection with most of the conventional seat belts and shoulder harness, one of the primary objects of this invention is to provide an attachment for the conventional safety seat belts and shoulder harness, the attachment being of such nature as to decrease the perspiration factor, thereby increasing the incentive for using these safety devices in the course of ordinary driving.

Another object of this invention is to provide a safety belt and shoulder harness with means which may be optionally connected with the air conditioning system of an automotive vehicle or with the heating system thereof whereby the restraining equipment may be adjusted to a temperature which is comfortably acceptable to the body of the wearer.

A further object of this invention is to provide an attachment for the conventional safety belt and shoulder harness of automotive vehicles wherein the attachment may be utilized in connection with the ambient atmosphere or may be connected with a conventional source of heating or cooling air in the vehicle in order that the seat belt or shoulder harness may be brought to substantially body temperature to prevent and to protect the clothing from becoming soiled or disarranged as a consequence of discomfort experienced by the operator or passenger in that area of the clothing directly in contact with the belt or harness.

Still another object of this invention is to provide an attachment for existing seat belts and shoulder harness for automotive vehicles and aircraft, the attachment being adapted for connection with the usual air-heating or air-conditioning system of the vehicle or, optionally, being responsive to changes in the residual air of the vehicle in order to maintain the seat belt and/or shoulder harness at substantially the temperature of the air in the vehicle.

It is a further object of this invention to provide an air-conductive attachment for the seat belt and/or shoulder harness of an automotive vehicle which may be readily connected thereon and removed therefrom, and in the event of damage to the attachment the component elements thereof may be readily replaced.

In the main, it is among the primary objects of this invention to provide an attachment for existing seat belts and shoulder harness of conventional vehicles, the attachment providing, optionally, a cooling or heating flow of air over the skin surfaces of the wearer immediately adjacent the belt or shoulder harness. The attachment constitutes means for preventing perspiration spoilage of those portions of the clothing lying immediately below the belt and shoulder harness and eliminates the need for constantly shifting the clothes relative to the belt and harness which is attendant, necessarily, by the unwanted mussing and creasing of the clothing which creates the general air of disarray to those persons disbarking from the vehicle.

Apathy on the part of the public to use seat belts or shoulder straps, aside and apart from the discomforture normally encountered through their use, is otherwise generated due to the fact that the usual seat belt and/or shoulder strap becomes soiled in use and the soilage is, in turn, transmitted to the clothing of the wearer of the seat belt or strap through frictional contact. Since it is normally difficult to disconnect the seat belt and shoulder straps from their anchorages, it is seldom that an attempt is made to insure the cleanliness or sanitary condition of such equipment. It is, thus, another object of this invention to provide an attachment for a seat belt or shoulder strap of the general nature referred to above, the attachment being readily detachable from its associated belt or strap and readied for any conventional cleaning operation.

It is further recognized that it is seldom that two persons occupying a single seating space, successively, will adjust a seat belt or shoulder strap to exactly the same positions as was used by his predecessor. Consequently, and to facilitate the use of this attachment, it is proposed to provide quick detachable means at each end of the attachment whereby the attachment may be easily connected to and shifted longitudinally of the seat belt or shoulder strap whereby the user may be insured of the maximum of comfort prior to the time the secondary or final securing means are moved into position.

This invention contemplates, as still another object thereof, the provision of an attachment for the conventional automobile seat belt and shoulder harness, to provide a flow of heated or cooled air to the body of the wearer, the attachment being non-complex in construction and assembly, inexpensive to manufacture, which is durable in use, and which may be easily cleaned.

Other and further objects and advantages of the instant invention will become more evident from a consideration of the following specification when read in conjunction with the annexed drawings, in which:

FIGURE 5 is an enlarged detail cross-sectional view, FIGURE 5 being taken substantially on the vertical plane of line 5—5 of FIGURE 2, looking in the direction of the arrows;

FIGURE 6 is an enlarged top plan view of a seat belt or shoulder strap attachment constructed in accordance with this invention and observing the inner side thereof;

FIGURE 7 is a fragmentary side elevational view of an automotive vehicle illustrating a mode of use of the seat belts and shoulder straps in accordance with the first modified form of this invention, FIGURE 7 illustrating the seat belts and shoulder straps in connection with the air-conditioning or air-heating system of an automotive vehicle;

FIGURE 8 is an enlarged front elevational view of the seat belts and shoulder straps as shown in FIGURE 7;

FIGURE 9 is an exploded perspective view of an element of the first modification of this invention as used in conjunction with a forced air system;

FIGURE 10 is an end elevational view of one of the units shown in FIGURES 1 to 6, inclusive, or the element of FIGURE 9 and illustrating the permissive deformation of one of the air circulating units;

FIGURE 11 is a fragmentary side elevational view of one end of a seat belt or shoulder strap attachment showing the same as being connected with said seat belt or attachment;

FIGURE 12 is a perspective view of the first modified form of this invention illustrating the same as being connected with a source of forced heated or cooled air of such systems of a vehicle;

FIGURE 13 is an enlarged detail transverse cross-sectional view, FIGURE 13 being taken substantially on the vertical plane of line 13—13 of FIGURE 12, looking in the direction of the arrows;

FIGURE 14 is a top plan view of the means for conducting air under pressure into the first modification of this invention and showing the lead-off conduit for connecting the attachment of the seat belt with the attachment of the shoulder strap attachment;

FIGURE 15 is a top plan view of a seat belt or shoulder strap attachment observing the inner side thereof and constructed in accordance with the first modification; and FIGURE 16 is a top perspective view of elements of the attachment constructed in accordance with the second modification of the invention.

Figure 1:
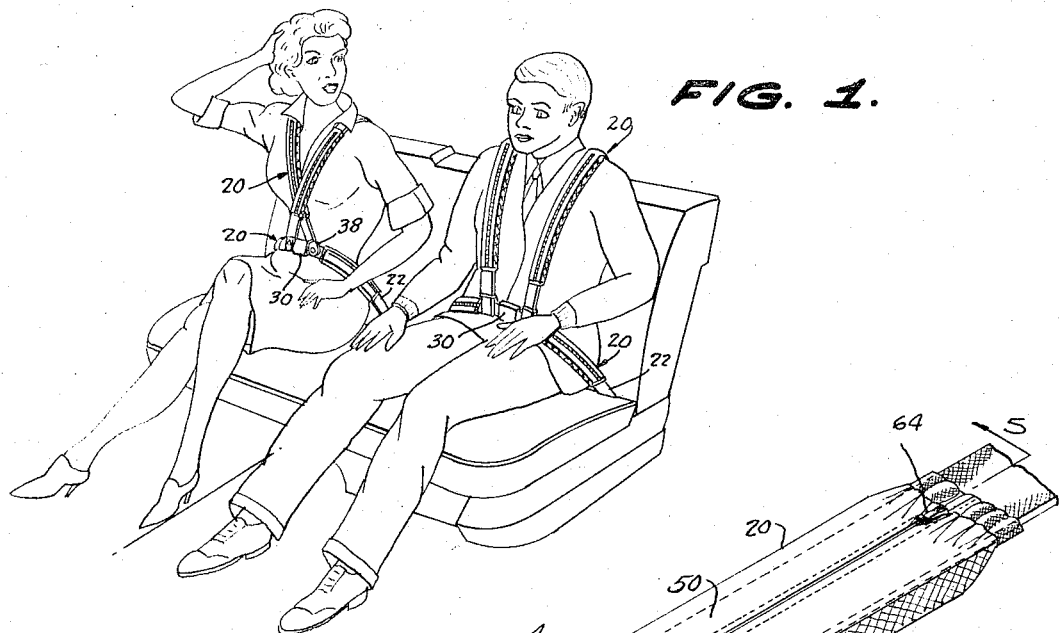
FIGURE 1 is a perspective view of a seat belt and shoulder attachment constructed in accordance with this invention.
Figure 2:
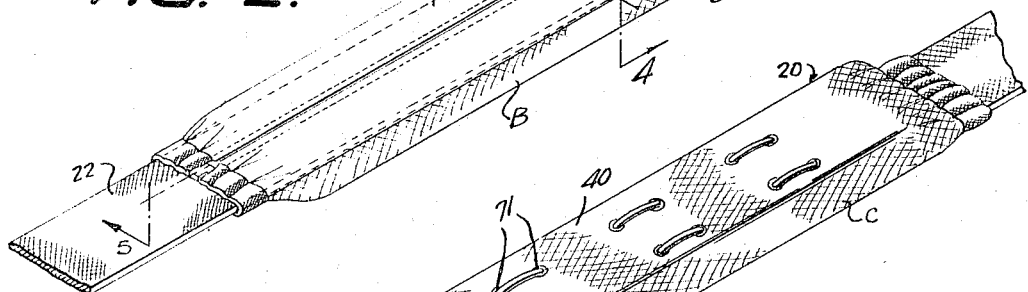
FIGURE 2 is an enlarged top perspective view of the attachment shown in FIGURE 1.
Figure 3:
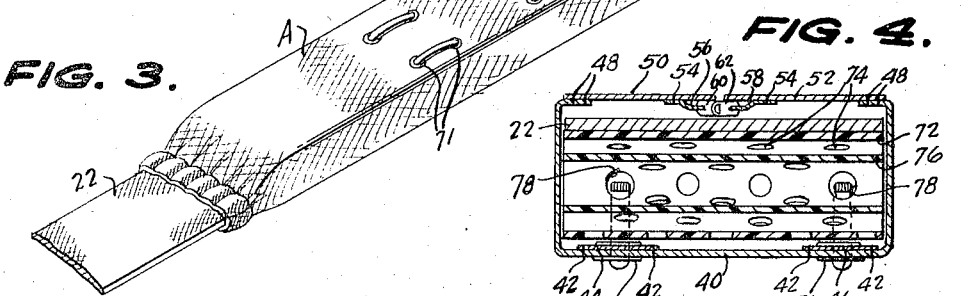
FIGURE 3 is an enlarged bottom perspective view of the attachment shown in FIGURE 1.

Referring now more specifically to the drawings, reference numeral 20 designates, in general, a seat belt or shoulder strap or harness attachment constructed in accordance with one embodiment of this invention. As has been stated above, one of the primary functions of the attachment is to provide means for circulating the air of the ambient atmosphere in and around the body areas of the wearer immediately adjacent the seat belt and shoulder harness to prevent perspiration from accumulating in the areas covered by the seat belt or shoulder strap to the extent that the same will soil the user's garments, and to obviate the necessity of the wearer pulling on the garments to shift the perspiration-soaked portions of the garments from one position to another in order to obtain some degree of comfort while wearing the seat belt and shoulder harness.

In the first embodiment of this invention as is illustrated in FIGURES 1 to 6, inclusive, the attachment 20 is shown in conjunction with a conventional two-piece seat belt wherein, for convenience, each seat belt has been ascribed the same reference numeral 22. Each seat belt 22 is formed of a relatively heavy flexible nylon webbing of the type currently found acceptable to the SAE. Each of the seat belt pieces 22 is provided with an end 22A (see FIGURE 7) which is securely anchored as at 24 to the floor 26 of the vehicle 27 or to the seat supporting structure 28 thereof, all in the well-known manner. The free ends of the two-piece belt assembly are releasably connected together as by a buckle 30 also of conventional construction, and the free ends of the belt pieces 22 joined by the buckle 30 meet substantially at the mid-section of the torso of the user.

Shoulder harness or straps for both male and female occupants of the vehicle 27 are identical in construction and comprise a pair of elongated flexible, but at the same time, substantially rigid straps 32 which may be formed of a nylon webbing as before. The straps 32 have one of their respective ends anchored to the vehicle 27 as by anchoring means similar to the means 24, or in any other suitable manner. Preferably, adjustment buckle 34 is provided in each of the shoulder straps 32 to accommodate passengers having differing physical characteristics. The other ends of the shoulder straps 32 are connected with either of the belt pieces 22 adjacent the buckle 30, as, for example, through the clip means 36 (see FIGURES 1 and 8) when the shoulder straps are used with male passengers. The shoulder straps 32 for female passengers are preferably crossed over the chest of the user, as shown in FIGURE 1, to pass between the breasts, and the free ends of the shoulder straps 32 are releasably connected to the belt pieces 22 by any conventional means, such as is indicated at 38.

The foregoing description of the seat belt pieces 22 and of the harness or shoulder straps 32 describes what is known as being conventional in the art, and taken per se, does not constitute a part of the instant invention. The belt and strap attachments 20 comprise the immediate subject matter of the invention and the foregoing description of the conventional equipment was deemed necessary in order to provide intelligence as to the use of the instant invention.

Figure 4:
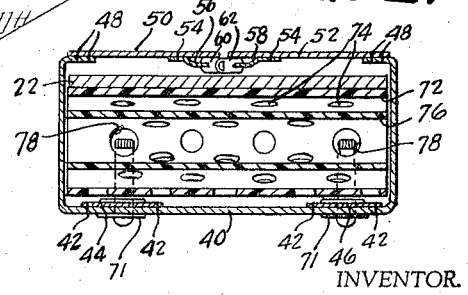
FIGURE 4 is an enlarged detail cross-sectional view, FIGURE 4 being taken substantially on the vertical plane of line 4—4 of FIGURE 2, looking in the direction of the arrows.

As is illustrated in FIGURES 1 to 6, inclusive, the attachment for both seat belt pieces and both shoulder straps 22, 32 constitutes an elongated substantially rectangular sheet of wide mesh netting 40 to the inside of which is stitched or sewed as at 42, a pair of centrally-located laterally-spaced and substantially parallel elongated rectangular strips of fabric material 44, 46. As is seen in FIGURE 6, the strips of fabric material 44, 46 extend substantially from end-to-end of the netting 40. The longitudinally-extending marginal edges are sewed or stitched as at 48 (see FIGURE 4), to one of the longitudinally-extending marginal edges of a pair of elongated substantially rectangular panels 50, 52, and to the underside of the latter, reference being made to FIGURE 4, and at the opposed free ends thereof are connected by stitching 54 one of the longitudinally-extending marginal edges, respectively, of elongated substantially rectangular tapes 56, 58. As is seen in FIGURE 4, the tapes 56, 58 underlie the free edges of the panels 50, 52 and the free edges of the tapes 56, 58 are provided with conventional zipper fastening elements 60, 62, the zipper fastening elements 60, 62 being adapted for connection and disconnection by means of the usual slide fastener 64.

Reference numeral 66 designates lines of stitching which are employed to secure a pair of elongated substantially elastic strips of tape 68, 70 to the underside of the netting 40 and the panels 50, 52 adjacent the opposed ends of the attachment 20. The stitching is done while the tapes 68, 70 are under tension whereby upon release of the tension the opposed ends of the attachment 20 will tend to gather in such a manner as to reduce the width thereof as compared with the width of the central body portion which extends therebetween and as is clearly seen in FIGURE 6. To the opposed ends of the tape 70 is connected a hook 70A which is adapted to cooperate with an eye 70B in a manner to be described.

Extending through the strips of fabric material 44, 46 and the netting 40 are a plurality of longitudinally-aligned pairs of grommets 71 (see FIGURE 4). Disposed between each adjacent pair of grommets 71 and proximate the grommets at each end of the fabric materials 44, 46 are disposed first pairs of substantially hollow elongated cylindrical members 72 which may be formed of a metal or of any substantially rigid plastic which will flex without fracturing. Each cylinder 72 is provided with a plurality of transversely-extending openings 74 with a pair thereof adjacent each end of the cylinder member 72 being diametrically-opposed with respect to one another. The pairs of cylindrical members 72 are axially parallel to one another and are disposed in side-by-side relationship. Reference numeral 76 denotes second pairs of elongated substantially hollow cylindrical members, each being formed of a metal or plastic, as before, and each of the cylindrical members 76 have formed therein a plurality of transversely-extending openings 78 of which a pair thereof adjacent each end of the cylindrical members 76 are diametrically-opposed. As is seen in FIGURES 4 and 5, the second pairs of elongated substantially hollow cylindrical members 76 are disposed, respectively, within the first pairs of hollow cylindrical members 72 and, reference being made to FIGURE 4, it is seen that their axial lengths are practically identical.

One elongated substantially flexible lace is designated by reference numeral 80, the lace 80 terminating at one of its ends in a hook 82 and its other end in a tip 84. A second flexible lace bears reference numeral 86 and terminates at one end in an eye 88 and at its other end in a tip 90. As is seen in FIGURES 5 and 6, the hook 82 and eye 88 are normally disposed at that end of the attachment 20 oppositely-disposed with respect to the hook 70A and eye 70B.

As is clearly seen in FIGURES 5 and 6, the lace 80 is threaded through a first pair of cylindrical members 72 and a respective associated second pair of cylindrical members 76 adjacent one end of the attachment 20 after which the lace 80 is threaded alternately through the pairs of grommets 71 and the strip 44 and the next succeeding pairs of the cylindrical members 72 together with their associated cylindrical members 76, it being understood that the threading is done through the diametrically-opposed openings 74 and 78, and that these openings are aligned with one another. In a similar manner, the lace 86 is threaded through the other ends of the first pair of cylindrical members 72 and their respective associated cylindrical members 76 at the other ends thereof and through the diametrically-opposed aligned openings 74, 76 in the manner described above. The lacing is done in such a manner as to dispose the hook 82 and the eye 88 in proximity to one another to effect their ready detachable connection.

To utilize the attachment 20, the user extends the same longitudinally of the inner side of one of the seat belt elements 22 or shoulder straps 32 after which the hook and eye ends of the laces 80, 86 are passed around the belt 22 and the hook 82 is then detachably connected with the eye 88. The tip ends of the laces 80, 86 are then drawn and also passed around the belt element 22 after which they are knotted as at 90. In effecting this assembly, it should be noted that portions of the cylindrical members 72 are brought into direct contact with the inner side of the seat belt element 22 and that in drawing and knotting the laces 80, 86, the cylindrical members 72, 76 assume a substantially concentric relationship relative to one another as is illustrated in FIGURE 4.

The netting 40 is now folded around the outer ends of the hollow cylindrical members 72, 76 and the panels 50, 52 are extended across the outer side of the seat belt element 22. Thereafter, the zipper fastener 64 is engaged with the zipper fastening elements 60, 62 in the usual manner and the fastener elements are closed, one with the other, whereby the seat belt element 22 is completely encased by the attachment 20.

In completing the assembly of the attachment 20 with the seat belt element 22, the netting 40, in its contact with the outer cylindrical members 72, assumes the shape of a substantially rectangular inner wall A (see FIGURE 3) from which laterally project sidewalls B, C held in laterally-spaced and substantially parallel relation relative to one another by means of the opposed ends of the hollow cylindrical elements 72, 76. The panels 50, 52 which overlie the outer side of the seat belt element 22 may be said to comprise an outer wall D (see FIGURE 2). The elastic tapes 68, 70 securely grip the seat belt element 22 (or the strap 32) in such a manner as to prevent any longitudinal shifting of the attachment 20 relative to the seat belt 22 and thereby maintains the same in its selected position thereon.

The attachment 20 may be, of course, easily removed from the seat belt element 22 through the simple expedient of reversing the direction of the movement of the slide fastener 64 to effect separation of the zipper connector elements 60, 62 whereby the hooks 70A and 82 may be disconnected from their respective eyes 70B, 88 to permit separation of the attachment 20 and seat belt element 22 or shoulder strap 32.

In FIGURES 7, 8, 9, and 12 to 15, inclusive, a second embodiment of this invention has been illustrated. In this embodiment, the same general principles for permitting the free air circulation between the body of the wearer of the seat belt or shoulder strap have been preserved, but to which certain refinements have been added. This embodiment of the invention has been generally ascribed reference numeral 100 and comprises an elongated substantially rectangular sheet of fabric material 101 (see FIGURES 13 and 15) of finer mesh than the netting 40 described in the previous embodiment of this invention. As before, a pair of substantially centrally-located laterally-spaced and parallel elongated strips of fabric material 102, 104 are fixedly secured to the sheet of fabric material 101 as by the lines of stitches 106. As in the previous embodiment of this invention, the strips 102, 104 and sheet 101 are penetrated by means of a plurality of longitudinally-spaced grommets 108 arranged in groups of pairs, and superimposed on the strips 102, 104 and extending transversely across the fabric 101 are a plurality of elongated substantially hollow cylindrical members 110 each of which is provided with a plurality of openings extending transversely therethrough of which, at least a pair thereof at each of the ends of the hollow cylindrical member 110 are disposed in diametrically-opposed relationship. Each of the cylindrical members 110 is formed of a metallic material or of a plastic material which may be deformed without fracturing, and as is seen in FIGURES 12 and 13, each of the hollow cylindrical members 110 is provided with an opening 114 intermediate its ends, the opening 114 extending along a chord thereof. To serve a purpose to be described, the opening 114 is provided with a plurality of gripping teeth 116.

Inserted within each of the hollow cylindrical members 110 is a second hollow cylindrical member 118 having a plurality of openings extending transversely threethrough and, as before, at least a pair of openings 120 adjacent each end of the hollow cylindrical member 118 is diametrically opposed. The hollow cylindrical member 118 is provided with an opening or cut-out 122 (see FIGURE 9) intermediate its ends, the opening or cut-out 122 facing in the same direction as the opening or cut-out 114 formed in the hollow cylindrical member 110.

The diametrically-opposed pairs of openings 112, 120 at the opposite ends of the hollow cylindrical members 110, 118 are threaded, as before, by means of flexible laces 124, 126 which also pass through the grommets 108, the hollow cylindrical members 110 together with their associated hollow cylindrical members 118 being arranged in groups of pairs longitudinally of the fabric 101.

The inner hollow cylindrical members 118, in this instance, have a shorter axial length than the axial length of the outermost ones 110 thereof, and the outer ends of the hollow cylindrical members 110 are plugged by means of sponge rubber air-pervious discoidal members 127.

Reference numeral 130 designates a blower connected with either the hot air or air-conditioning systems of the vehicle 27. The blower includes a distributor head 132 which is, in turn, connected through a conduit 134 with a header 136 fixedly secured to the floor 26 of the vehicle 27. The distributor head 132 and the header 136 connect through flexible conduits 138 and coupler 140 with one end of an elongated substantially hollow cylindrical conduit 142 having a closed end 144. As is seen in FIGURE 14, the conduit 142 is provided with outwardly-projecting circumferential stop rings 146, 148 between which are disposed a plurality of openings 150 which progress in diameter from the stop ring 146 to the stop ring 148.

The flexible conduit 142 is normally depressed into the openings or cut-outs 114, 122 and is firmly retained therein by means of the gripping teeth 116.

Reference numeral 152 denotes a lead-off conduit having one of its ends connected with the conduit 142 adjacent the coupling 140. As is seen in FIGURE 14, the lead-off conduit 152 is offset with respect to the conduit 142 and extends longitudinally of the fabric sheet 101 along adjacent ends of the hollow cylindrical members 110. The above-described construction holds true with the attachment 100 when used with the seat belt element 22 or with the shoulder strap 32, the only exception being that it is preferable that the lead-off pipe 152 for the seat belt element 22 terminates in a male connector 154 which is adapted for connection with a female connector 156 which connects the lead-off connector 152 of the attachment 100 used in conjunction with the shoulder strap to the source of air under pressure.

In assembling the attachment 100 with either the seat belt element 22 or its counterpart forming the shoulder strap 32, one end of the lace 124 terminates in a hook 156 which is adapted for detachable connection with an eye 158 connected to the adjacent end of the lace 126. As is seen in FIGURE 15, the laces 124, 126 are wrapped about the seat belt element 22 or the strap 32 and the hook 156 and eye 158 are detachably connected together. The laces 124, 126 at their other respective ends engage around the seat belt element 22 and an adjacent portion of the lead-off conduit 152, and these ends of the laces are then knotted as at 160.

The strip of fabric 101 includes a longitudinally-extending substantially rectangular portion 162 which is adapted to be wrapped around the lead-off conduit 152 (see FIGURE 13). The free marginal edge of the portion 162 is stitched or sewed as at 164 to one of the longitudinally-extending marginal edges of a fabric panel 166, the panel 166 being adapted to extend over the outer side of the seat belt element 22 or its counterpart, the strap 32. Stitches 168, spaced inwardly from the other free edge of the panel 166 fixedly secure an elongated strip of fabric material 170 thereto, the strip 170 carrying thereon the usual conventional zipper fastener 172.

The other side of the strip of fabric material 101 is folded about the other ends of the hollow cylindrical elements 110 and is stitched at 174 to the longitudinally-extending marginal edge of a second elongated fabric panel 176 which extends over the seat belt element 22. To the panel 176 adjacent its other longitudinally-extending marginal edge is sewed as at 178 an elongated strip of fabric material 180, the strip 180 extending below the panel 176 and having secured to its free marginal edge a plurality of zipper fastening elements 182 which complement the fastening elements 172. A conventional slide fastener 184 (see FIGURE 12) is utilized in connecting the slide fastener elements 172, 182 together.

As in the previous embodiment of this invention, the opposed ends of the sheet of fabric material 101 are provided with elastic bands 186, 188 which are adapted to tightly grip against the seat belt element 22 when the attachment 100 is secured thereon, and it will be noted that the elastic strip 188 has secured thereto adjacent its opposed ends a hook 190 which is adapted to cooperate with an eye 192 to assist in holding the attachment 100 in fixed position relative to the seat belt element 22.

In this form of the invention, the forced air extending through the conduits 142 tend to maintain the seat belt element 22 and the strap 32 at substantially constant temperatures and simultaneously therewith maintain the body of the user at those areas normally contiguous with the seat belt element 22, or the shoulder strap 32 at substantially the same temperature, thereby reducing the possibility of the accumulation of perspiration which normally tends to the spoilage of the garments, as well as the discomfort of the wearer. It is understood, of course, that the openings 114, 122 face inwardly toward the underside of the seat belt element 22 and the strap 32.

In FIGURE 16 is illustrated still another embodiment of this invention similar to that shown in FIGURES 1 to 6, inclusive. In this embodiment of the invention the laces are identified by reference numerals 80', 86' and are shown as extending through diametrically-opposed openings 200 adjacent each end of pairs of semicylindrical members 202. The semicylindrical members 202 are laced on the seat belt element 22 in the same manner as previously described, but in this instance, the open sides of the semicylindrical members 202 are disposed in confronting relationship relative to the inner side of the belt element 22. In all other respects the two inventions are identical.

FIGURE 10 is an end elevational view of one of the elements shown in FIGURE 9, and illustrates, in phantom lines, that the outer hollow cylindrical member 110 may be deformed substantially to the degree shown and without impairing the efficiency of the attachment. It is preferable, of course, that the hollow cylindrical member 110 be formed of a material possessing some flexibility whereby should damage be incurred through collision between vehicles or through other accidental and inadvertent occasions, the outer hollow cylindrical member 110 will return substantially to its original cylindrical configuration.

In FIGURE 11 is illustrated a hook-and-eye connection which may be made at one of the ends of any of the embodiments of the invention herein illustrated and described, the hook and eye being shown in this figure as being disposed on the inner side of any one of the attachments.

In all embodiments of the invention, the several attachments are clearly illustrated as being adjustable relative to the longitudinal axis of the belt or strap to which they are connected, and the main body portions of each modification are shown as being formed of fabric or of a flexible material which will permit the attachment, together with the cylindrical or arcuate members connected thereto, to be easily connected and disconnected from the safety belt or strap, and since the cylindrical and arcuate elements are merely laced to the fabric or webbing of the main body portion of each attachment herein described and illustrated, the fabric or webbing may be easily washed or cleaned after the disconnection of the spacer elements thereby insuring the wearer of the attachment that contact of the attachment with his clothing will not result in soilage as a consequence of a direct contact therebetween.

Having described and illustrated several embodiments of this invention in detail, it will be understood that the same are offered merely by way of example, and that this invention is to be limited only by the scope of the appended claims.

What is claimed is:

1. An attachment for a substantially rectangular safety belt of a vehicle, said safety belt having opposed sides facing inwardly and outwardly of the body of the wearer, an elongated substantially rectangular strip of air-pervious material surrounding said belt and having a pair of opposed ends, elastic means secured to each of said ends to releasably connect said strip on said belt, and a plurality of substantially hollow arcuate members connected to said strip and engaging the inner side of said belt to hold said belt in spaced relation relative to the body of the user.

2. An attachment for an elongated substantially rectangular safety belt of a vehicle, said safety belt having opposed sides facing inwardly and outwardly of the body of the wearer, an elongated substantially rectangular strip of air-pervious material folded about said belt and having the longitudinally-extending free edges thereof disposed adjacent the outer side of said belt, flexible means releasably securing said free edges together, elastic means at each end of said strip encircling and frictionally engaging said belt to hold said strip in position thereon, a plurality of cylindrical members disposed between said strip and the inner side of said belt, said cylindrical members having a plurality of openings extending transversely therethrough, said cylindrical members extending transversely of said strip and belt in longitudinally-spaced relation relative thereto, and flexible means threaded through said strip and said cylindrical members to releasably secure said cylindrical members on said strip for engagement with the inner side of said belt.

3. An attachment for a safety belt having opposed sides facing inwardly and outwardly of the body of the user, said attachment comprising an elongated substantially rectangular strip of air-pervious material folded about said belt and having a pair of adjacent longitudinally-extending free edges extending along the outer side of said belt, flexible means connecting the free edges of said strip, elastic means at each end of said strip to frictionally engage the belt and to encircle the same, a plurality of elongated substantially hollow cylindrical members having a plurality of openings extending transversely therethrough with at least a pair of said openings being diametrically-opposed adjacent each end of said cylindrical members, a pair of laces extending longitudinally of said strip in laterally-spaced and substantially parallel relationship, said laces being, respectively, threaded through said strip and through said diametrically-opposed openings at each end of said cylindrical members, and means releasably connecting together the adjacent ends of said laces.

4. An attachment for a safety belt having opposed sides facing inwardly and outwardly of the body of the user, said attachment comprising an elongated substantially rectangular strip of air-pervious material folded about said belt and having a pair of adjacent longitudinally-extending edges extending along the outer side of said belt, flexible means connecting together said free edges, elastic means at each end of said strip surrounding said belt and frictionally engaging said belt to hold said strip against displacement longitudinally of said belt, a plurality of elongated substantially hollow cylindrical members extending transversely of the inner side of said belt in longitudinally-spaced relation, said cylindrical members being disposed in pairs with each pair being regularly spaced from an adjacent pair, said cylindrical members each having a plurality of openings extending transversely therethrough with each of said cylindrical members having a pair of diametrically-opposed openings at each end thereof, said cylindrical members being disposed intermediate said strip and said belt and extending transversely of the latter, a pair of laterally-spaced, substantially parallel flexible laces threaded through said strip and said diametrically-opposed openings of said cylindrical members to detachably connect said cylindrical members with said strip.

5. An attachment for a safety belt having opposed sides facing inwardly and outwardly of the body of the user, said attachment comprising an elongated strip of air-pervious material folded about said belt and having a pair of free edges extending longitudinally of said belt, means flexibly connecting said free edges together, elastic means at each end of said strip surrounding said belt and frictionally engaging the same to hold said strip against displacement longitudinally of said belt and to hold said ends of said strip in substantially air-tight relationship with respect thereto, a plurality of elongated substantially hollow cylindrical members extending transversely of the inner side of said belt and the adjacent side of said strip, said cylindrical members being longitudinally-spaced along said belt and said strip in pairs, each of said cylindrical members having a plurality of openings extending transversely therethrough of which a pair thereof adjacent each end of said cylindrical members are diametrically opposed, a pair of flexible laterally-spaced and substantially parallel laces threaded through said strip longitudinally thereof and through said diametrically-opposed openings to releasably connect said cylindrical members to said strip, means releasably securing together the adjacent ends of said laces, each of said cylindrical members having an opening formed therein intermediate the ends thereof and confronting said inner side of said belt, said last-named openings extending on a chord of each of said cylinders, an elongated substantially hollow tubular conduit having opposed open and closed ends, said conduit being disposed within said last-named openings with said closed end being embraced within said strip, and said open end of said conduit extending beyond said elastic means at one end of said strip for connection with a source of air under pressure.

6. An attachment for a safety belt having opposed sides facing inwardly and outwardly of the body of the user, said attachment comprising an elongated strip of air-pervious material folded about said belt and having a pair of adjacent longitudinally-extending free edges extending longitudinally of the outer side of said belt, means flexibly connecting said free edges together, elastic means at each end of said strip surrounding said belt and frictionally engaging said belt to prevent displacement of said strip in a longitudinal direction relative to said belt and to effect a substantially airtight connection therewith, a plurality of elongated substantially hollow cylindrical members extending transversely across the inner side of said belt and the confronting side of said strip in longitudinally-spaced side-by-side relationship, said cylindrical members being grouped in laterally-spaced pairs, each of said cylindrical members having a plurality of openings extending transversely therethrough with a pair of said openings at each end of each of said cylindrical members being diametrically-opposed, a pair of laces threaded through said strip in laterally-spaced and substantially parallel relationship, said laces being threaded through said diametrically-opposed pair of openings of each of said cylindrical members, each of said cylindrical members having an opening extending therethrough on a chord thereof intermediate its said ends, said last-named opening normally facing the inner side of said belt, said last-named openings each having a plurality of gripping teeth at the periphery thereof, an elongated substantially hollow flexible cylindrical conduit having a pair of opposed open and closed ends, said conduit having a plurality of openings extending transversely therethrough and being disposed in said last-named openings to be held in place by said teeth, said closed end of said conduit being enclosed by said strip and said open end extending beyond said elastic means at one end of said strip for connection with a source of air under pressure, and said openings formed in said conduit progressing in size from said open end to said closed end thereof.

7. An attachment for a safety belt having a pair of opposed sides facing inwardly and outwardly of the body of the wearer, said attachment comprising an elongated substantially rectangular strip of air-pervious material folded about said belt and having a pair of adjacent longitudinally-extending free edges disposed longitudinally of the outer side of said belt, means flexibly connecting said free edges together, elastic means at each end of said strip surrounding said belt to prevent displacement thereof in a longitudinal direction relative to said belt and to effect a substantially airtight connection therewith, a plurality of first elongated substantially hollow cylindrical members disposed between the inner side of said belt and the adjacent side of said strip, said first cylindrical members extending transversely across said belt and strip in longitudinally-spaced relation relative thereto and being arranged in groups of pairs positioned in side-by-side relationship, said first hollow cylindrical members having a plurality of openings extending transversely therethrough and having a pair thereof diametrically-opposed adjacent each end thereof, a second hollow cylindrical member for each first cylindrical member, said second cylindrical members being disposed within said first cylindrical members, said second cylindrical members having a plurality of openings extending transversely therethrough with a pair thereof adjacent each end of said second cylindrical members being diametrically-opposed, each of said first and second cylindrical members having a cut-out formed therein facing the inner side of said belt and extending along a chord of said first and second cylindrical members, a pair of flexible laces threaded through said strip in laterally-spaced and substantially parallel relation and threaded through, respectively, said pairs of diametrically-opposed openings, means releasably connecting together adjacent pairs of ends of said laces, an elongated substantially hollow cylindrical flexible conduit having opposed open and closed ends, said conduit being disposed within said cut-outs with said closed end thereof being embraced by said strip and the other end thereof projecting beyond said elastic means at one end of said strip for connection with a source of air under pressure, and said flexible conduit being provided with a plurality of openings extending transversely therethrough which progress in diameter from said open to said closed end thereof.

8. An attachment for a safety belt of a vehicle as defined in claim 7, wherein the periphery of said cut-outs of said first cylindrical members are each provided with a plurality of teeth to grip and retain said conduit within said cut-outs of said first and second cylindrical members.

9. An attachment for a safety belt of a vehicle as defined in claim 8, wherein the axial length of said second cylindrical members is shorter than the axial length of said first cylindrical members, and an air-pervious plug being disposed at each end of each of said first cylindrical members to prevent axial shifting of said second cylindrical members relative thereto.

10. An attachment for a safety belt of a vehicle and including the safety belt or shoulder harness therefor, each of said belts having opposed sides facing inwardly and outwardly of the body of the wearer, said attachment for each of said belts comprising an elongated substantially rectangular strip of air-pervious material each folded about its respective belt and having a pair of longitudinally-extending free edges disposed longitudinally of its associated belt at the outer side thereof, flexible means connecting said free edges of each of said strips together, elastic means at each end of each of said strips surrounding its associated belt to prevent displacement thereof longitudinally of its belt and to effect the substantially airtight connection therewith, a plurality of first elongated substantially hollow cylindrical members disposed between the inner sides of said belts and the adjacent side of its associated strip, said first cylindrical members extending transversely of said belts and strips in longitudinally-spaced relation relative thereto and being arranged in groups of pairs disposed in side-by-side relationship, said first cylindrical members having a plurality of openings extending transversely therethrough and including a pair of diametrically-opposed openings adjacent each end thereof, a second substantially hollow cylindrical member for each of said first cylindrical members, said second cylindrical members each having a plurality of openings extending transversely therethrough with a pair thereof adjacent each of its respective ends being diametrically-opposed, a pair of flexible laces for each of said strips, said laces being threaded through its associated strip in laterally-spaced and substantially parallel relation and through said pairs of diametrically-opposed openings formed in said first and second cylindrical members for each of said strips, means connecting together adjacent pairs of ends of said laces to support said first and second cylindrical members in concentric relation relative to one another, said second hollow cylindrical members having a shorter axial length than said first hollow cylindrical members, an air-pervious plug for each end of said first cylindrical members to hold said second cylindrical members against axial movement relative thereto, said concentric hollow cylindrical members of each of said strips having cut-outs formed therein facing the inner side of said belt and being in registry with one another, an elongated substantially hollow flexible conduit for the cutouts of the cylindrical members of each of said strips, each of said conduits having a pair of opposed open and closed ends, said conduit being disposed and frictionally held within said cut-outs with said closed ends being encompassed by its respective strips and the open ends thereof projecting outwardly from beneath one of said elastic means at one end of each of said strips, the open end of one of said conduits being adapted for connection with a source of air under pressure, a branch conduit connecting said open end of said one conduit with the open end of said second conduit, means detachably connecting said branch conduit with said second conduit, and said first and second conduits each having a plurality of openings extendings transversely therethrough progressing in size from their respective open ends to their respective closed ends.

11. An attachment for a safety belt of a vehicle, said attachment comprising a strip of flexible air-pervious material connected with said belt and extending longitudinally thereof, substantially rigid means extending transversely of said belt and strip at longitudinally spaced intervals, said rigid means having a plurality of air passage means formed therein, and said rigid means being interposed between said belt and said strip to space said belt from the body of the user.

References Cited by the Examiner

UNITED STATES PATENTS

| | | | |
|---|---|---|---|
| 2,068,061 | 1/1937 | May | 297—385 X |
| 2,084,174 | 6/1937 | Young | 2—320 |
| 2,544,381 | 3/1951 | Goldmerstein | 128—384 X |
| 2,826,135 | 3/1958 | Benzick | 297—180 X |
| 2,938,356 | 5/1960 | McMahon | 128—384 X |
| 3,075,517 | 1/1963 | Morehead | 128—384 X |
| 3,149,501 | 9/1964 | Keir | 297—180 |
| 3,162,489 | 12/1964 | Trotman | 297—180 X |

FOREIGN PATENTS

| | | |
|---|---|---|
| 321,016 | 10/1902 | France. |
| 1,124,239 | 6/1956 | France. |
| 1,368,324 | 6/1964 | France. |
| 1,860 | 1886 | Great Britain. |

FRANK B. SHERRY, *Primary Examiner.*

JAMES T. McCALL, *Assistant Examiner.*